United States Patent
Kim et al.

(10) Patent No.: US 9,838,195 B2
(45) Date of Patent: Dec. 5, 2017

(54) METHOD OF MEASURING SELF-INTERFERENCE CHANNEL AND USER EQUIPMENT THERETO

(71) Applicant: LG ELECTRONICS INC., Seoul (KR)

(72) Inventors: Kitae Kim, Seoul (KR); Jinmin Kim, Seoul (KR); Kwangseok Noh, Seoul (KR); Kukheon Choi, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 73 days.

(21) Appl. No.: 14/895,902

(22) PCT Filed: May 28, 2014

(86) PCT No.: PCT/KR2014/004751
§ 371 (c)(1),
(2) Date: Dec. 3, 2015

(87) PCT Pub. No.: WO2014/200212
PCT Pub. Date: Dec. 18, 2014

(65) Prior Publication Data
US 2016/0127114 A1   May 5, 2016

Related U.S. Application Data

(60) Provisional application No. 61/832,972, filed on Jun. 10, 2013.

(51) Int. Cl.
*H04L 5/14* (2006.01)
*H04W 72/08* (2009.01)
(Continued)

(52) U.S. Cl.
CPC ......... *H04L 5/1461* (2013.01); *H04B 17/345* (2015.01); *H04W 24/08* (2013.01); *H04W 72/0453* (2013.01); *H04W 72/082* (2013.01)

(58) Field of Classification Search
CPC ..... H04W 24/08; H04W 72/00; H04W 72/04; H04W 72/0453; H04W 72/08;
(Continued)

(56) References Cited

U.S. PATENT DOCUMENTS 9,504,048 B2 * 11/2016 Cheng
9,713,010 B2 *  7/2017 Khandani ............. H04W 16/14
(Continued)

FOREIGN PATENT DOCUMENTS

CN   102356593   2/2012
KR   10-2010-0021383   2/2010
(Continued)

OTHER PUBLICATIONS

European Patent Office Application Serial No. 14811378.0, Search Report dated Jan. 12, 2017, 9 pages.
(Continued)

*Primary Examiner* — Tri H Phan
(74) *Attorney, Agent, or Firm* — Lee Hong Degerman Kang & Waimey

(57) ABSTRACT

A method of measuring a self-interference channel in user equipment in a full duplex radio (FDR) communication environment is disclosed. The method includes receiving, from a base station, resource allocation information including information about a time interval, the base station stopping transmission of a signal in the time interval for measurement of the self-interference channel in the user equipment, transmitting a first reference signal for measurement of the self-interference channel in the time interval specified by the resource allocation information, and receiv-
(Continued)

ing a second reference signal input to a receiver of the user equipment according to self-interference in the time interval, wherein the second reference signal is a signal corresponding to the first reference signal transmitted over a wireless channel.

13 Claims, 6 Drawing Sheets

(51) Int. Cl.
*H04W 72/04* (2009.01)
*H04W 24/08* (2009.01)
*H04B 17/345* (2015.01)

(58) Field of Classification Search
CPC ...... H04W 72/082; H04W 72/12; H04L 5/14; H04L 5/1461; H04B 7/26; H04B 17/00; H04B 17/20; H04B 17/345
See application file for complete search history.

(56) References Cited

U.S. PATENT DOCUMENTS

| | | | |
|---|---|---|---|
| 9,713,143 B2* | 7/2017 | Kim | H04W 72/044 |
| 2008/0070510 A1 | 3/2008 | Doppler et al. | |
| 2010/0111018 A1* | 5/2010 | Chang | H04B 7/15585 370/329 |
| 2012/0063369 A1* | 3/2012 | Lin | H04B 7/15542 370/279 |
| 2012/0201173 A1 | 8/2012 | Jain et al. | |
| 2013/0102254 A1 | 4/2013 | Cyzs et al. | |
| 2013/0114468 A1 | 5/2013 | Hui et al. | |
| 2013/0301487 A1* | 11/2013 | Khandani | H04W 16/14 370/278 |
| 2015/0071062 A1* | 3/2015 | Cheng | H04B 7/0689 370/230 |
| 2015/0103802 A1* | 4/2015 | Cheng | H04L 5/0048 370/330 |
| 2015/0280887 A1* | 10/2015 | Ko | H04B 1/525 370/330 |
| 2015/0312905 A1* | 10/2015 | Seo | H04B 7/2656 370/280 |
| 2015/0327293 A1* | 11/2015 | Luo | H04W 72/12 370/252 |
| 2016/0099802 A1* | 4/2016 | Noh | H04W 72/042 370/277 |

FOREIGN PATENT DOCUMENTS

| | | |
|---|---|---|
| KR | 10-1015200 | 2/2011 |
| WO | 2011111113 | 9/2011 |

OTHER PUBLICATIONS

The State Intellectual Property Office of the People's Republic of China Application Serial No. 201480033087.0, Office Action dated Nov. 30, 2016, 6 pages.

Choi, et al., "Achieving Single Channel, Full Duplex Wireless Communication," Proceedings of the Sixteenth Annual International Conference on Mobile Computing and Networking, Sep. 2010, 12 pages.

PCT International Application No. PCT/KR2014/004751, Written Opinion of the International Earching Authority dated Sep. 17, 2014, 9 pages.

* cited by examiner

[Fig. 1]
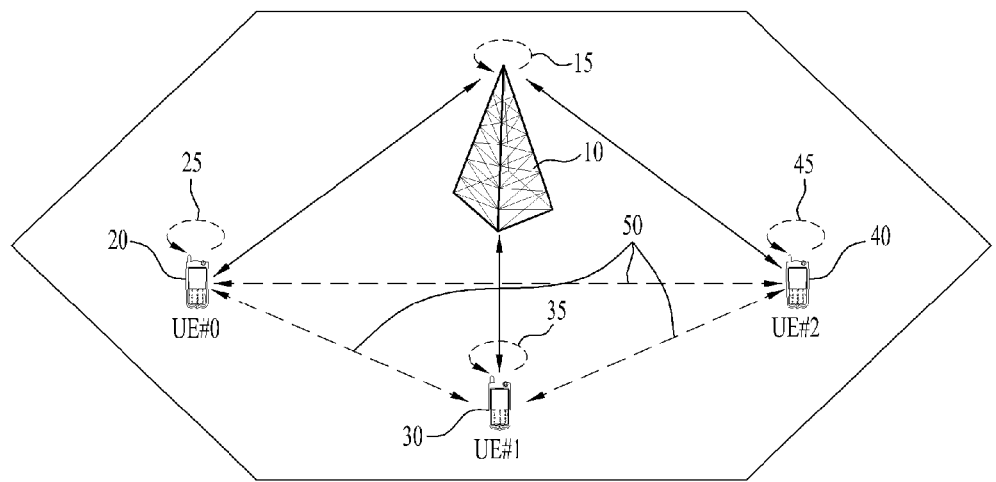
[Fig. 2]
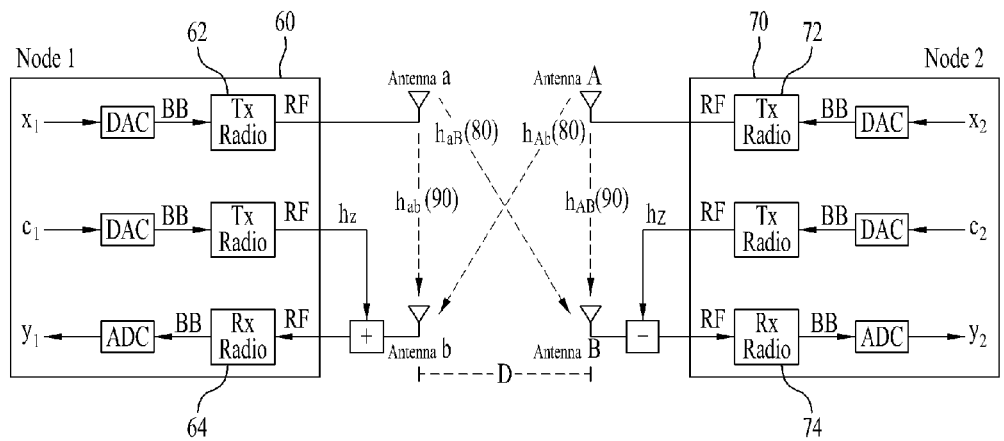
[Fig. 3]
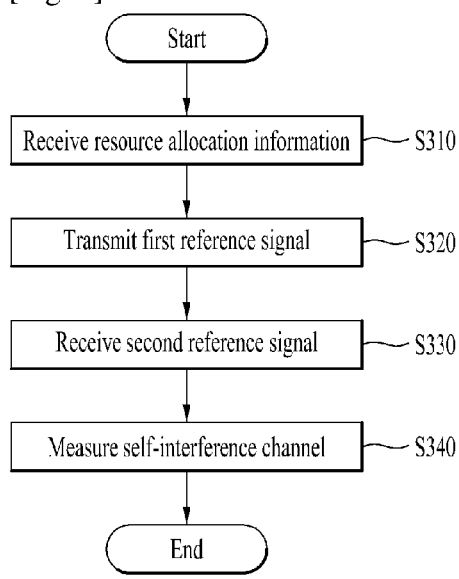

[Fig. 4]
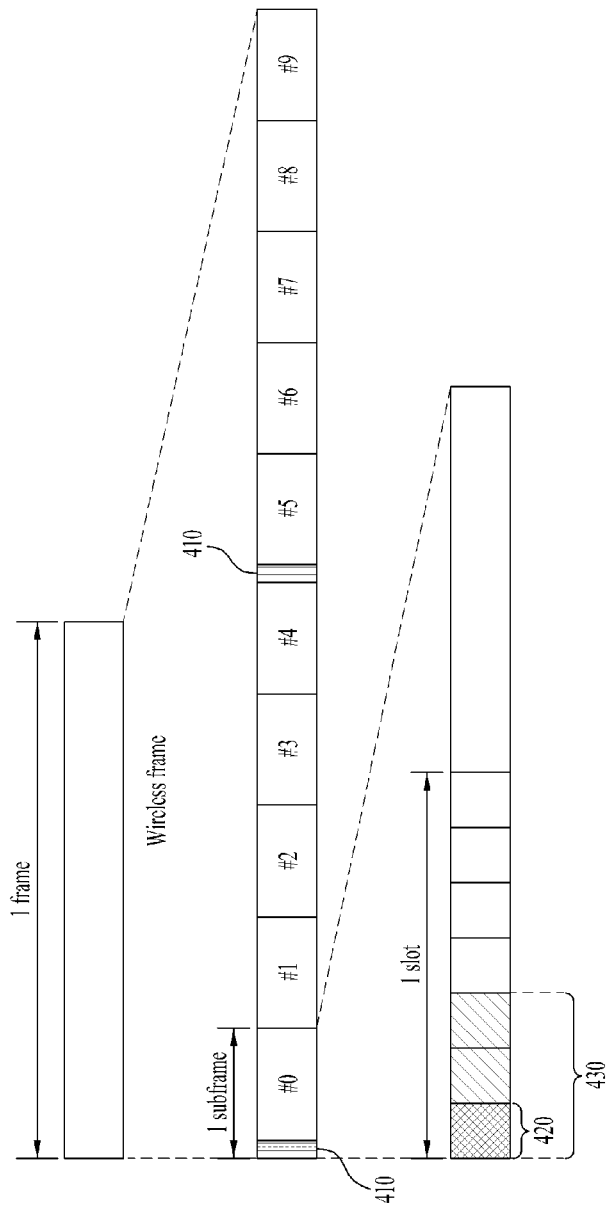

[Fig. 5]
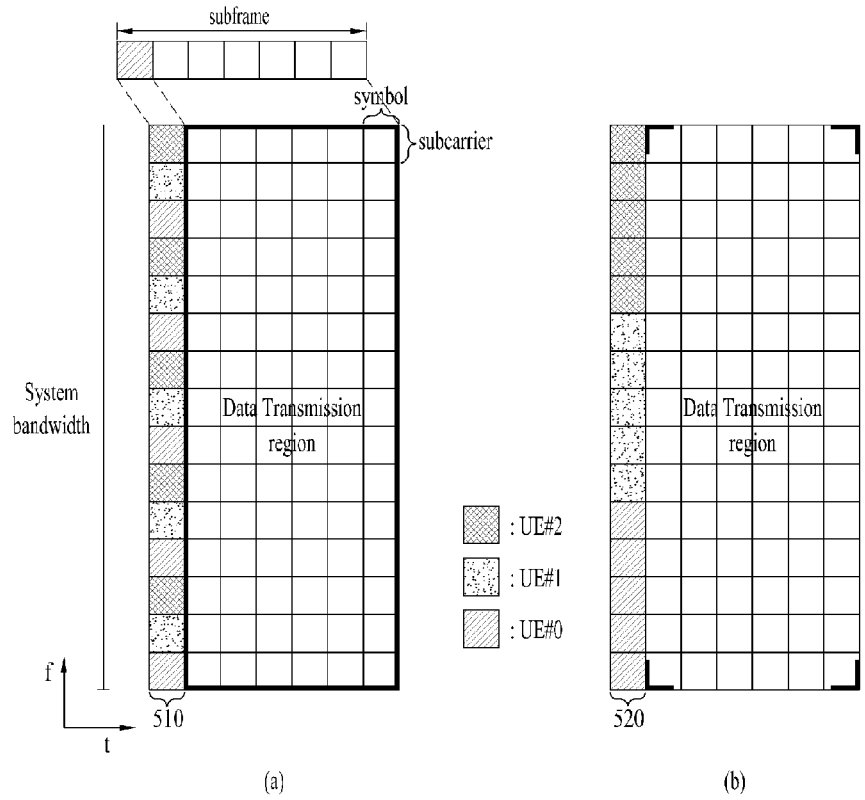
[Fig. 6]
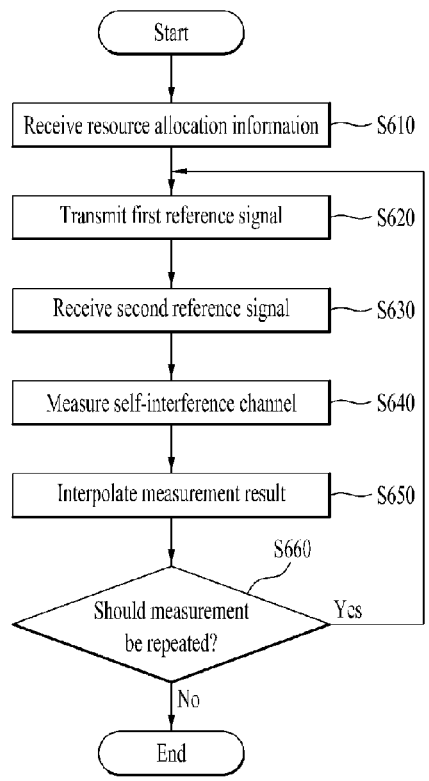

[Fig. 7]
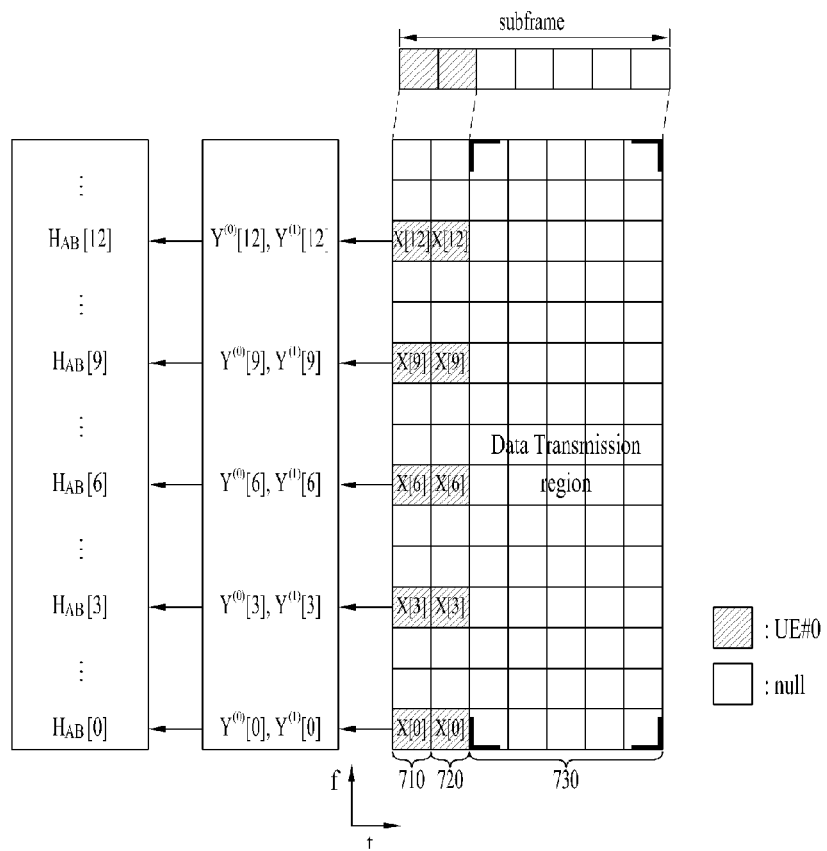
[Fig. 8]
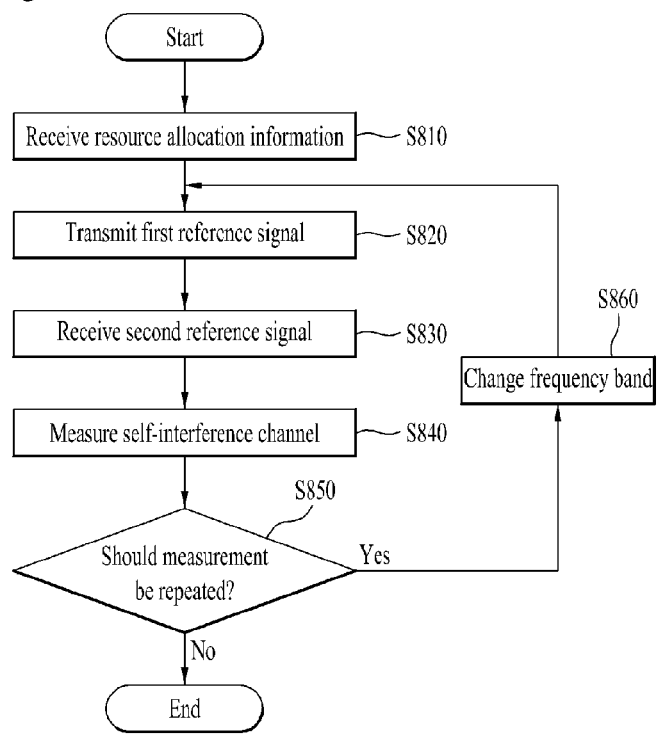

[Fig. 9]
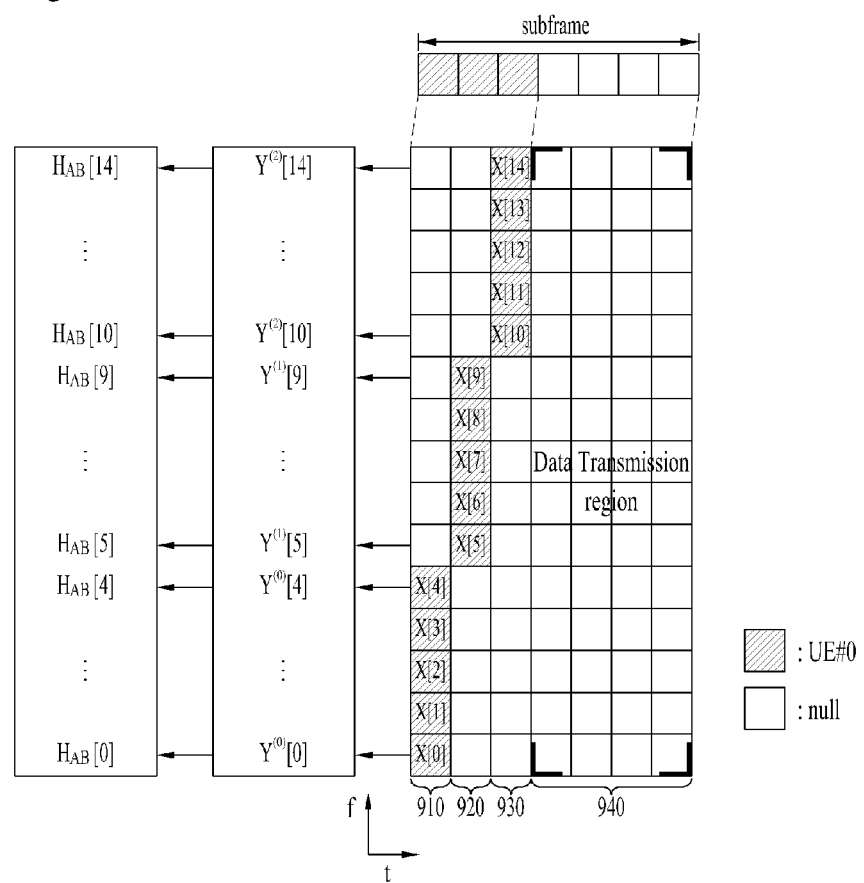

[Fig. 10]
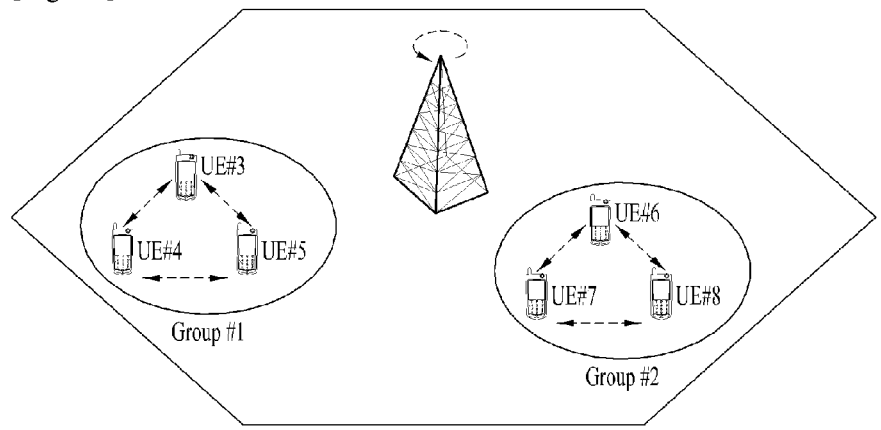
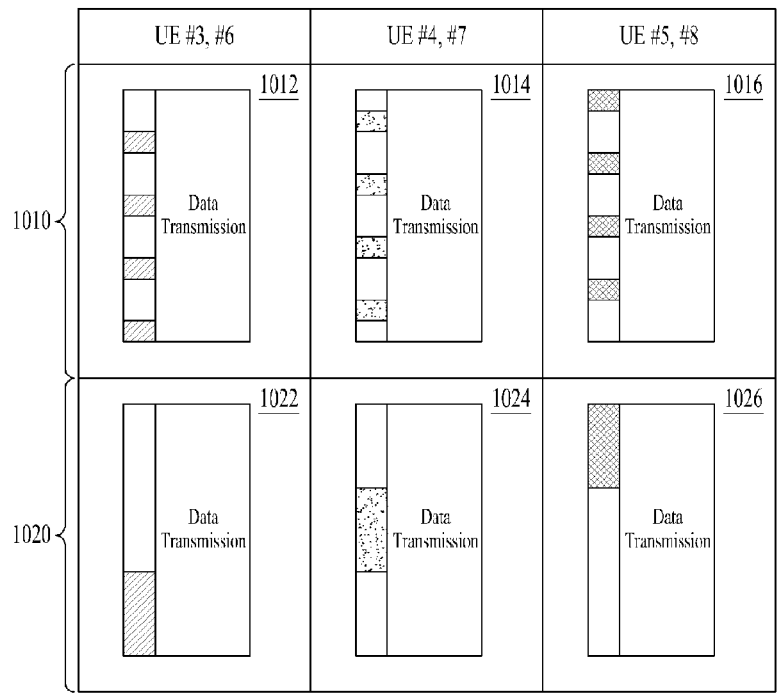
[Fig. 11]
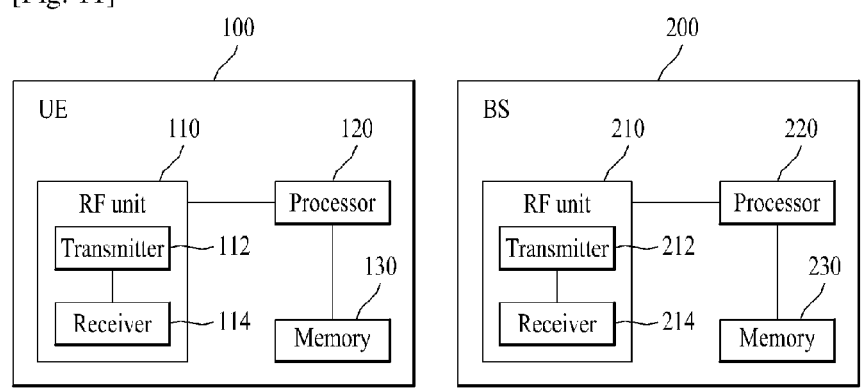

METHOD OF MEASURING SELF-INTERFERENCE CHANNEL AND USER EQUIPMENT THERETO

CROSS-REFERENCE TO RELATED APPLICATIONS

This application is the National Stage filing under 35 U.S.C. 371 of International Application No. PCT/KR2014/004751, filed on May 28, 2014, which claims the benefit of U.S. Provisional Application No. 61/832,972, filed on Jun. 10, 2013, the contents of which are all hereby incorporated by reference herein in their entirety.

TECHNICAL FIELD

The present invention relates to a method of measuring a self-interference channel in a user equipment, a user equipment for the same, and a computer-readable medium having the method recorded.

BACKGROUND ART

A base station or a mobile terminal performs communication using a frequency division duplex (FDD) scheme, in which a transmission/reception resource of a signal is divided into frequencies, and a half duplex radio (HDR) scheme which employs a time division duplex (TDD) scheme, in which the transmission/reception resource is divided into time slots.

However, in the HDR communication scheme, transmission and reception cannot be performed simultaneously within the same frequency/time resource. Accordingly, introduction of the FDR communication scheme has been proposed for more efficient resource use. FDR communication refers to a scheme in which a base station or a terminal performs transmission and reception operations simultaneously using a resource of the same time-frequency region.

Since transmission and reception are performed simultaneously in a communication environment with the FDR scheme, self-interference, which refers to reception of a signal from a base station or a mobile terminal through the receive antenna of the same base station or mobile terminal, occurs, and several methods have been proposed to address self-interference.

DISCLOSURE OF INVENTION

Technical Problem

The present invention is proposed to solve the technical problems as described above. An object of the present invention is to provide a method of measuring a self-interference channel by analyzing a reference signal input to a receiver of a device from a transmitter of the same device.

Another object of the present invention to a method of accurately measuring a self-interference channel excluding other factors than self-interference by performing measurement of a time resource specified by a base station.

Another object of the present invention is to improve the efficiency of measurement of a self-interference channel by performing the measurement process using a frequency resource specified by a base station.

Objects of the present invention are not limited to the aforementioned ones. Other objects of the invention will become apparent to those having ordinary skill in the art upon examination of the following description of embodiments of the present invention.

Solution to Problem

Method of measuring self-interference channel is proposed to solve above-mentioned technical problems. And, user equipment thereto is also disclosed herein.

Advantageous Effects of Invention

As apparent from the embodiments of the present invention, the present invention may have effects as follows.

First, self-interference occurring in the FDR communication environment may be cancelled by efficiently measuring a self-interference channel.

Second, as the self-interference channel is measured in a time interval specified by a base station, accuracy and reliability of the measurement result may be improved.

Third, as the self-interference channel is measured using a frequency resource specified by the base station, accuracy of the measurement result and efficiency may be improved.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be devised by a person skilled in the art through the embodiments of the present invention.

BRIEF DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings:

FIG. 1 illustrates interference occurring in a full duplex radio (FDR) communication environment;

FIG. 2 illustrates a self-interference channel related to self-interference occurring in an FDR communication environment;

FIG. 3 is a flowchart illustrating a method of measuring a self-interference channel, in relation to one embodiment of the present invention;

FIG. 4 illustrates a time interval allocated by a base station for measurement of a self-interference channel according to one embodiment of the present invention;

FIG. 5 illustrates a frequency band allocated by a base station for measurement of a self-interference channel according to one embodiment of the present invention;

FIG. 6 is a flowchart illustrating a method of measuring a self-interference channel through a frequency band allocated to certain intervals, in relation to one embodiment of the present invention;

FIG. 7 illustrates a method of repeating channel measurement through the frequency band allocated to certain intervals, in relation to one embodiment of the present invention;

FIG. 8 is a flowchart illustrating a method of measuring a self-interference channel through a frequency band allocated to a continuous interval, in relation to one embodiment of the present invention;

FIG. 9 illustrates a method of repeatedly performing channel measurement through the frequency band allocated to a continuous interval, in relation to one embodiment of the present invention;

FIG. 10 illustrates a method of configuring a user equipment group and allocating a frequency resource, in relation to one embodiment of the present invention; and FIG. 11 is a block diagram illustrating configurations of a user equipment and a base station related to one embodiment of the present invention.

BEST MODE FOR CARRYING OUT THE INVENTION

The object of the present invention can be achieved by providing a method of measuring a self-interference channel in user equipment in a full duplex radio (FDR) communication environment, including receiving, from a base station, resource allocation information including information about a time interval, the base station stopping transmission of a signal in the time interval for measurement of the self-interference channel in the user equipment, transmitting a first reference signal for measurement of the self-interference channel in the time interval specified by the resource allocation information, and receiving a second reference signal input to a receiver of the user equipment according to self-interference in the time interval, wherein the second reference signal is a signal corresponding to the first reference signal transmitted over a wireless channel.

The method may further include measuring the self-interference channel by comparing the second reference signal with the first reference signal.

The resource allocation information may further include information about a frequency band used by the user equipment to transmit the first reference signal in the time interval for measurement of the self-interference channel, wherein the information about the frequency band may indicate that the frequency band has been allocated to certain intervals or a continuous interval.

The method may further include interpolating, when the frequency band is allocated to the certain intervals, results measured through the frequency band.

When the frequency band is allocated to the certain intervals, the method may further include repeatedly performing the transmitting of the first reference signal and the receiving of the second reference signal a predetermined number of times, and measuring the self-interference channel from an average value of results of the repeated performance.

When the frequency band is allocated to the continuous interval, the method may further include changing the frequency band and transmitting a third reference signal in a next interval subsequent to the time interval, and receiving a fourth reference signal in the next interval, the fourth reference signal being a signal corresponding to the third reference signal input to the receiver of the user equipment according to self-interference.

In the transmitting of the first reference signal, a signal may not be transmitted in any frequency band other than the frequency band specified by the resource allocation information.

In another aspect of the present invention, provided herein is a user equipment for measurement of a self-interference channel in a full duplex radio (FDR) communication environment, including a transmitter, a receiver, and a processor connected to the transmitter and the receiver to measure the self-interference channel, wherein the processor is configured to receive, from a base station, resource allocation information including information about a time interval, the base station stopping transmission of a signal in the time interval for measurement of the self-interference channel, transmit a first reference signal for measurement of the self-interference channel in the time interval specified by the resource allocation information, and receive a second reference signal input to a receiver of the user equipment according to self-interference in the time interval, wherein the second reference signal is a signal corresponding to the first reference signal transmitted over a wireless channel.

MODE FOR THE INVENTION

Although the terms used in this specification are selected, as much as possible, from general terms that are widely used at present while taking into consideration the functions of the elements obtained in accordance with one embodiment, these terms may be replaced by other terms based on intentions of those skilled in the art, customs, emergence of new technologies, or the like. In addition, in certain instances, terms that are arbitrarily selected by the applicant may be used. In this case, meanings of these terms will be disclosed in detail in the corresponding part of the description of the invention. Accordingly, the terms used herein should be defined based on practical meanings thereof and the whole content of this specification, rather than based on names of the terms.

The embodiments described below are constructed by combining elements and features of the present invention in a predetermined form. The elements or features may be considered selective, if not explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features from another embodiment.

In describing the drawings, procedures or steps, which may obscure the main point of the present invention, will not be described nor will description of procedures or steps, which may be understood by those having ordinary skill in the art, be given.

In this specification, "comprise" or "include" should be understood as not precluding existence of one or more other constituents, if not stated otherwise. In addition, the terms "unit", "-er", "module", etc. signify a unit that processes at least one function or operation and may be implemented in hardware, software, or a combination of hardware and software. As used in the specification and appended claims, the terms "a", "an", "one", "the" and other similar terms include both singular and plural forms, unless context clearly dictates otherwise.

In this specification, embodiments of the present invention are described, focusing on the relationship between a base station (BS) and a mobile station (MS) in transmission/reception of data. Herein, the base station serves as a terminal node of a network that directly performs communication with mobile stations. In this document, an operation described as being performed by the base station may be performed by an upper node of the base station in some cases.

That is, in a network comprised of a plurality of network nodes including a BS, various operations performed for communication with an MS may be performed by the BS, or network nodes other than the BS. The term "base station" may be replaced with the terms "fixed station", "Node B", "eNode B (eNB)", "advanced base station (ABS)", or "access point".

In addition, the term "mobile station (MS)" may be replaced with a term "user equipment (UE)", "subscriber station (SS)", "mobile subscriber station (MSS)", "mobile terminal", "advanced mobile station (AMS)", or "terminal". Particularly, the term mobile station used in this specification may have same meaning as the term machine-to-machine device.

A transmitter refers to a fixed and/or mobile node that provides a data service or a voice service, and a receiver refers to a fixed and/or mobile node that receives a data service or a voice service. Therefore, an MS may serve as a transmitter and a BS may serve as a receiver, on uplink. Likewise, the MS may serve as a receiver and the BS may serve as a transmitter, on downlink.

The embodiments of the present invention may be supported by standard documents disclosed for at least one of an Institute of Electrical and Electronics Engineers (IEEE) 802.xx system, a 3rd Generation Partnership Project (3GPP) system, a 3GPP Long Term Evolution (LTE) system, a 3GPP LTE-Advanced (LTE-A) system, and a 3GPP2 system, which are wireless access systems. That is, obvious steps or portions which are not described in the embodiments of the present invention may be supported by the above documents.

All terms used herein may be explained by the standard documents. Particularly, the embodiments of the present invention may be supported by at least one of P802.16e-2004, P802.16e-2005, P802.16.1, P802.16p, and P802.16.1b, which are standard documents of the IEEE 802.16 system.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

In the following description of the embodiments of the present invention, specific terms are used in order to provide a thorough understanding of the present invention. These terms may be changed without departing from the spirit of the present invention.

1. FDR Communication

FIG. 1 illustrates interference occurring in a full duplex radio (FDR) communication environment. In the FDR communication environment, a BS and UEs 20, 30 and 40 perform transmission and reception using the same resource. In an FDR communication environment in which the same time resource and the same frequency resource are used for uplink (UL) and downlink (DL), self-interference (or self-user interference), multi-user interference, inter-BS interference, and the like may occur.

First, regarding the self-interference, the transmitter and receiver of a UE 20, 30, or a BS 10 performs transmission and reception using the same time/frequency resource. Since the transmitter and receiver are positioned close to each other, a signal transmitted from a UE or a BS may be introduced into the receiver of the same UE or BS. In FIG. 1, reference numerals 15, 25, 35 and 45 denote self-interference of the BS 10 and the UEs 20, 30 and 40.

Next, the multi-user interference may occur when two or more UEs positioned close enough to affect each other communicate with each other using the same time/frequency resource. FIG. 1 exemplarily shows multi-user interference 50 occurring between UE 0 20 and UE 1 30, between UE 1 30 and UE 2 40, and between UE 2 40 and UE 0 20.

Lastly, although not shown in FIG. 1, inter-BS interference, which is similar to the aforementioned multi-user interference, may occur between two or more BSs, 2. Self-Interference Channel FIG. 2 illustrates a self-interference channel related to self-interference occurring in an FDR communication environment.

In the FDR communication environment, cancellation of interference of the kinds illustrated in FIG. 1 is required. Especially, it is important to cancel self-interference occurring with intensity stronger than that of a reception signal expected by the receiver. That is, self-interference is about 60-90 dB stronger than a signal that the receiver receives from another UE or BS since the transmitter and the receiver of a UE are extremely close to each other, and should be essentially cancelled in order to ensure performance of FDR communication.

Referring to FIG. 2 illustrating self-interference, in exemplary communication between UE 1 60 and UE 2 70, a transmitter 62 of UE 1 60 transmits a signal 80 to a receiver 74 of UE 2 70, while a receiver 64 of UE 1 60 receives a signal 80 from a transmitter 72 of UE 2 70. Although an example of communication between UE 1 60 and UE 2 70 is given for simplicity of description, the following description may also be applicable to communication between a UE and a BS and between a BS and another BS.

Since UE 1 60 uses the same frequency/time resource on uplink/downlink, and the transmitter 62 and the receiver 64 of UE 1 60 are positioned physically close to each other, a signal 90 transmitted from the transmitter 62 may be directly received by the receiver 64 of UE 1 60. Similarly, a signal 90 transmitted from the transmitter 72 of UE 2 70 may be directly received by the receiver 74 of UE 2 70.

As methods for cancellation of self-interference, digital cancellation, which is applied before signals processed in a base band pass through a digital-to-analog converter (DAC) (or after reception signals pass through an analog-to-digital converter (ADC)), and analog cancellation, which is applied after a transmission signal passes through a DAC (or before a reception signal passes through an ADC), and antenna cancellation of cancelling an aggregate signal received through a transmit antenna by adjusting the distances between two or more transmit antennas are proposed.

In the case of digital cancellation, various techniques such as beamforming may be applied to cancel self-interference, and the range of interference cancellation may be between about 20 dB and 25 dB.

In analog cancellation, which is implemented in a second chain of transmit chains that is between the digital cancellation and the antenna cancellation, interference cancellation signals are directly created through digital estimation of self-interference and summed in the receiver. That is, the analog cancellation may be implemented such that directly received transmission/reception signals are cancelled by addition a signal produced by inverting a signal of the transmitter to a signal of the receiver. The maximum value of cancellation range of the antenna cancellation may be 45 dB.

Lastly, in antenna cancellation, a transceiver configured with two transmit antennas and one receive antenna causes signals transmitted from the two transmit antennas to have phases inverted by 180 degrees when the signals are introduced into the receive antenna. Thereby, antenna cancellation may be implemented such that the phase difference between the signals transmitted from the two transmit antennas becomes 180 degrees. Thereby, the aggregate signal received by the received antenna positioned between the transmit antennas may become null, i.e., 0. In other words, if the two transmit antennas are spaced apart from the receive antenna such that the distance between one transmit antenna and the receiver differs by λ?2 from the distance between the other transmit antenna and the receive antenna, the phases of the signals input to the receive antenna differ from each other by exactly 180 degrees.

In general, the antenna cancellation technique has low complexity and is thus easiest to implement. However, the maximum interference cancellation performance of the antenna cancellation technique is about 20-30 dB, while a self-interference cancellation performance of about 70 dB is required for the FDR system. Accordingly, self-interference cancellation may be achieved through a combination of the aforementioned three techniques. However, there is a specific communication environment in which the performance of antenna cancellation can be maximized.

That is, as system bandwidth decreases and the center frequency is shifted to a higher frequency, the performance of antenna cancellation drastically increases. Accordingly, if a narrow high frequency band is allocated to the FDR communication region, sufficient performance of self-interference cancellation may be ensured by the antenna cancellation technique alone. Accordingly, FDR performance may be ensured, and implementation complexity may also be lowered. A high frequency band of transmission is directed to broadband communication, in which transmission is implemented using a wide frequency band. Accordingly, if a region of the high frequency band of transmission is set as a band for FDR communication, an environment advantageous for self-interference cancellation through antenna cancellation may be created, and thus sufficient performance of self-interference cancellation may be achieved.

In the meantime, a UE or a BS needs to acquire information about a self-interference channel in order to implement interference cancellation. As shown in FIG. 2, acquisition of information about a self-interference channel hab or hAB over which a transmission signal of the UE or BS is input to the receiver of the same UE or BS is required.

Generally, the BS may readily acquire the channel information about the entire frequency band through puncturing of the same region for all UEs. However, if all UEs including the BS perform puncturing or nulling for the resource region allocated for estimation of the self-interference channel, excessive overhead or system loss may be caused in FDR communication. Accordingly, the present invention proposes that the UEs perform estimation of a self-interference channel simultaneously through the method described below.

3. Method of Estimating a Self-Interference Channel

FIG. 3 is a flowchart illustrating a method of measuring a self-interference channel, in relation to one embodiment of the present invention. The method illustrated in FIG. 3 may be implemented by a UE configured to perform communication in an FDR communication environment.

The UE receives resource allocation information from the BS (S310). The resource allocation information is information about a resource that the BS allocated to the UE to allow the UE to measure the self-interference channel. Herein, the resource allocation information may include time information and frequency information. For example, the resource allocation information may include at least one of information about time intervals and information about a frequency band.

Hereinafter, the resource allocation information will be described in detail. The time information may specify a time interval in which the BS does not transmit a signal. That is, to allow the UEs to measure a self-interference channel performing communication with the BS, the BS may not transmit any signal in a specific time interval.

The time interval specified by the resource allocation information may be a subframe in which the BS does not transmit any signal, or may be a slot or a symbol in the subframe. For example, the specified time interval may be set to a resource region corresponding to two or more symbols.

In addition, the time interval specified by the resource allocation information may have periodicity. For example, the BS may stop transmission of a signal in each time interval which is periodically repeated, thereby allowing the UEs to measure the self-interference channel. Meanwhile, as the length of the time interval in which the BS stops transmission of a signal increase, the efficiency of data transmission is lowered. Accordingly, the BS may adjust the period of the time intervals in which a signal is not transmitted, in consideration of the efficiency of data transmission.

Since the transmitter and the receiver of the UE are positioned physically close to each other, the self-interference channel is less influenced by external factors. Considering this fact, the BS may determine that estimation of the self-interference channel does not need to be performed frequently. Considering this point, the BS may determine the period of time intervals through the resource allocation information. For example, the period of time intervals may be set in units of a frame, two or more frames, or a subframe.

Next, the information about frequencies in the resource allocation information may specify a frequency band in which the UE transmits a reference signal for measurement of a self-interference channel. That is, the UE may transmit a reference signal in the time interval specified by the resource allocation information, utilizing the frequency band specified by the resource allocation information.

The resource allocation information may specify a frequency band including at least one frequency unit such as a subcarrier, and the subcarriers may be orthogonal to each other. The resource allocation information according to one embodiment may indicate that the frequency band has been allocated to certain intervals or a continuous interval for the UE, which will be described in detail with reference to FIGS. 5 to 9.

Meanwhile, the BS may broadcast the aforementioned resource allocation information. That is, each of the UEs connected to the BS may receive, in step S310, the resource allocation information broadcast from the BS in certain intervals.

The UE transmits a first reference signal (S320). That is, the UE may transmit the first reference signal for measurement of a self-interference channel, through the time interval and the frequency band specified by the resource allocation information received in step S310.

Thereafter, the UE receives a second reference signal (S330). The second reference signal refers to a signal that corresponds to the first reference signal transmitted over a wireless channel in step S320 and is received by the UE. That is, the first reference signal that the UE has transmitted through the transmitter thereof in step S320 is directly introduced into the receiver of the UE. Since the UE utilizes the same time/frequency resource for UL and DL in the FDR communication environment, the reference signal transmitted by the UE may be directly input to the receiver of the UE, and the second reference signal directly input to the receiver of the UE may be affected by a communication channel and thus have characteristics such as a phase and an amplitude which are different from those of the first reference signal.

The UE measures the self-interference channel by comparing the first reference signal with the second reference signal (S340). The UE may measure the self-interference channel by comparing the physical properties of the second reference signal such as phase and amplitude with the corresponding ones of the first reference signal, and recognize the channel environment from the transmitted of the UE to the receiver of the UE. For example, the UE may measure a ratio or relation between the transmitted first reference signal and the received second reference signal, thereby expressing the self-interference channel in various forms such as a value, a matrix and a bitmap.

Additionally, the BS stops transmission of a signal in the time interval specified by the resource allocation information. Thereby, no signal is transmitted from the BS while the UE transmits and receives a reference signal. Accordingly, the BS may independently and accurately measure influence of the self-interference channel.

In addition, if the BS is connected to a plurality of UEs, the BS specifies a different frequency band for each of the UEs through the resource allocation information, and each of the UEs does not utilize a frequency band other than the frequency band allocated thereto (which means transmission of a null signal). Thereby, even if multi-user interference occurs due to close proximity of the UEs connected to the BS, each UE may accurately measure its own self-interference channel.

FIG. 4 illustrates a time interval allocated by a base station for measurement of a self-interference channel according to one embodiment of the present invention. According to the embodiment illustrated in FIG. 4, a frame, which is a unit of time, may include ten subframes, and each subframe may include two slots. In addition, each slot may include six or seven symbols.

As described above, the resource allocation information may include information about the time interval in which the BS does not transmit any signal such that the UE may accurately measure the self-interference channel. In the illustrated embodiment, the BS may set subframe #0 and subframe #5 to time intervals 410 in which the BS does not transmit a signal. The information about the time intervals may be expressed with continuous bits. In the illustrated embodiment, the BS may express the time intervals in the resource allocation information using ten bits such as, for example, '1000010000'.

Further, if a subframe includes a plurality of symbols, the BS may set a time interval for the self-interference channel to a specific position in a subframe. For example, the BS may set the first symbol 420 in each of subframes #0 and #5 to the time interval for the self-interference channel. The BS may transmit, to the UE, the resource allocation information including the specific information about the symbols in a subframe, or may pre-transmit the specific information about the symbols to the UE separately from the resource allocation information so as to share the specific information about the symbols with the UE.

Alternatively, the BS may set two or more symbols 430 to time intervals for the self-interference channel, and the UE may repeat measurement of the self-interference channel in the time intervals corresponding to the plural symbols. By repeating the process of measurement of the self-interference channel in a plurality of time intervals, the UE may improve reliability of the measurement result or collect results of measurement of more frequency bands, which will be described in detail with reference to FIGS. 6 to 9.

FIG. 5 illustrates a frequency band allocated by a base station for measurement of a self-interference channel according to one embodiment of the present invention. In the embodiment illustrated in FIG. 5, the BS is connected to UE #0, UE #1 and UE #2 and specifies a frequency band for each of the UEs through the resource allocation information. The frequency bands allocated for the UEs are indicated differently from each other.

In FIG. 5, the horizontal direction of the grid pattern indicates time, and the vertical direction indicates a frequency band. Each grid may represent a resource element (RE).

In the embodiment of FIG. 5, the BS sets the first symbol of the seven symbols included in a subframe to the time interval for measurement of the self-interference channel. Alternatively, the BS may specify at least one symbol of seven symbols included in a slot, in place of the subframe. FIG. 5(a) illustrates allocation of a frequency band to certain intervals for each of the UEs, FIG. 5(b) illustrates allocation of the frequency band to a continuous interval for each of the UEs.

Referring to FIG. 5(a), the BS allocates the frequency band to certain intervals for each of UEs #0, #1 and #2. That is, in the illustrated embodiment, the BS may divide 15 subcarriers in each symbol into three groups of {0, 3, 6, 9, 12}, {1, 4, 7, 10, 13} and {2, 5, 8, 11, 14} according to the sequence of the subcarriers and allocate each of the subcarrier group for each of the three UEs. The information about the frequency band allocated for each of the UEs may be expressed in the format of continuous bits or a matrix. For example, UE #0 may be assigned with a subcarrier group {0, 3, 6, 9, 12} by the BS having received bit '00'.

Each of the UEs may measure the self-interference channel by transmitting the first reference signal and receiving the second reference signal through a frequency band allocated thereto in the time interval 510. Since the BS does not transmit a signal in the time interval 510, the UEs may accurately measure the self-interference channel. In addition, since each of the UEs utilizes only the frequency band allocated thereto (i.e., each of the UEs transmits a null signal through the frequency band other than the allocated frequency band), the UEs may measure the self-interference channel without being influenced by multi-user interference.

In FIG. 5(b), the BS allocates the frequency band to a continuous interval for each of UEs #0, #1 and #2. That is, the BS may divide 15 subcarriers into three subcarrier groups of {0, 1, 2, 3, 4}, {5, 6, 7, 8, 9}, and {10, 11, 12, 13, 14}, and allocate each group to a corresponding one of the three UEs. The information about the frequency band allocated for each UE may be expressed in the format of continuous bits or a matrix. For example, UE #0 having received bit '00' may be assigned with a subcarrier group {0, 1, 2, 3, 4} from the BS. As in the example of FIG. 5(a), each of the UEs may subsequently measure the self-interference channel through the frequency band allocated thereto in the time interval 520.

FIGS. 6 and 7 illustrate another embodiment related to the embodiment illustrated in FIG. 5(a, and FIGS. 8 and 9 illustrate another embodiment related to the embodiment illustrated in FIG. 5(b).

FIG. 6 is a flowchart illustrating a method of measuring a self-interference channel through a frequency band allocated to certain intervals, in relation to one embodiment of the present invention. In steps S610 to S640 of FIG. 6, the UE receives resource allocation information from the BS, and transmits and receives reference signals through the time interval and the frequency band specified by the resource allocation information, thereby measuring the self-interference channel. Steps S610 to S640 of FIG. 6 are similar to steps S310 to S340, and thus a detailed description thereof will not be given below.

The UE interpolates the result of measurement of the self-interference channel (S650). That is, as described above with reference to FIG. 5(a), each of the UEs is assigned with a frequency band allocated to certain intervals and does not use any frequency band other than the frequency band allocated thereto. Thereby, each of the UEs may interpolate the measurement result in order to acquire self-interference channel information about the frequency bands which are allocated to the other UEs.

Referring to FIG. 5(a), UE #0 assigned with subcarrier group {0, 3, 6, 9, 12} needs to acquire not only the self-interference information about the frequency band of the subcarrier group allocated thereto but also the self-interference information about the frequency bands of the subcarrier group {1, 2, 4, 5, 7, 8, 10, 11, 13, 14} allocated to UE #1 and UE #2. Accordingly, UE #0 may estimate the self-interference channel information about the frequency bands which are not allocated to UE #0 by interpolating the results of measurement of a self-interference channel for the subcarrier group {0, 3, 6, 9, 12}.

For example, UE #0 may interpolate the measurement result for subcarrier 0 and the measurement result for subcarrier 3, thereby estimating the measurement results for subcarrier 1 and subcarrier 2 which are frequency bands between subcarrier 0 and subcarrier 3. In this way, the UE may acquire information about self-interference channels for the entire system bandwidth through the interpolation process. According to one embodiment, the UE may utilize various interpolation techniques such as Newton interpolation, Lagrange interpolation, Aitken interpolation, Neville interpolation, and Spline interpolation in order to interpolate the measurement results in step S650.

Subsequently, the UE determines whether to repeat the process of measurement of a self-interference channel (S660). Whether to repeat the measurement process may be determined according to the time interval specified by the resource allocation information received in step S610. For example, if two or more symbols are set to the time interval for measurement of a self-interference channel in the resource allocation information, the UE may repeat the measurement process during the period of the set symbols.

FIG. 7 illustrates a method of repeating channel measurement through the frequency bands allocated to certain intervals, in relation to one embodiment of the present invention.

UE #0 set the symbols 710 and 720 to the time interval for measurement of a self-interference channel according to the resource allocation information received from the BS. The symbol 730 representing the other time interval is a region in which the UE performs data communication with the BS. The BS performs transmission and reception of data in the symbol 730, but does not transmit a signal during the symbols 710 and 720. In addition, UE #0 set the subcarrier group {0, 3, 6, 9, 12} specified by the resource allocation information to the frequency band for measurement of a self-interference channel.

First, UE #0 transmit a first reference signal and receives a second reference signal Y(0)[k] (k=0, 3, 6, 9, 12) in the time interval of the symbol 710. Subsequently, UE #0 may acquire Y(1)[k] by repeating transmission of the first reference signal and reception of the second reference signal in the time interval of the symbol 720. The UE may improve the reliability of a result of measurement of a self-interference channel for each subcarrier by applying the least square technique to the received signals according to Equation 1 given below.

$$H_{AB}[k] = \frac{1}{N}\left[\frac{1}{X[k]}\left(\sum_{n=1}^{N} Y^{(n)}[k]\right)\right]$$ Equation 1

In Equation 1, HAB[k] may denote a self-interference channel for subcarrier [k], k denotes each subcarrier (i.e., a frequency band having a certain interval), N may denote the maximum number of times of repetitions (i.e., the entire time interval in which estimation of a self-interference channel is repeated), X[k] may denote the first reference signal transmitted by the UE, n may denote the number of times of repetition, and Y(n)[k] may denote a second reference signal received by the UE.

If the first reference signal transmitted by the UE is a unit signal having the magnitude of 1, Equation 1 may be simplified as Equation 2 given below.

$$H_{AB}[k] = \frac{1}{N}\sum_{n=1}^{N} Y^{(n)}[k]$$ Equation 2

Through the above equation, the UE may measure a self-interference channel for a subcarrier group allocated thereto and interpolate the measurement results, thereby estimating the self-interference channel for the subcarrier groups of the other UEs. Further, by repeating the process described above, the UE may improve accuracy and reliability of the result of measurement of a self-interference channel for the measured entire system bandwidth of the frequency bands having certain intervals.

FIG. 8 is a flowchart illustrating a method of measuring a self-interference channel through a frequency band allocated to a continuous interval, in relation to one embodiment of the present invention. In steps S810 to S840 in FIG. 8, the UE receives resource allocation information from the BS, and transmits and receives reference signals through the time interval and the frequency band specified by the resource allocation information, thereby measuring a self-interference channel. Steps S810 to S840 of FIG. 8 are similar to steps S310 to S340 of FIG. 3, and thus a detailed description thereof will not be given below.

The UE determines whether to repeat measurement of a self-interference channel (S850). Whether to repeat the measurement process may be determined according to the time interval specified by the resource allocation information received in step S810. For example, if two or more symbols are set to the time interval for measurement of a self-interference channel in the resource allocation information, the UE may repeat the measurement process during the set symbols.

Once the UE is determined to repeat measurement of the self-interference channel, the UE changes the frequency band and performs measurement of the self-interference channel (S860). That is, the UE having assigned with a frequency band of a continuous interval as described above with reference to FIG. 5(b) may change the frequency band and continues the measurement so as to acquire self-interference channel information about another frequency band.

In the case of the example shown in FIG. 5(b), UE #0 assigned with subcarrier group {0, 1, 2, 3, 4} needs to acquire self-interference channel information about subcarriers {5, 6, 7, 8, 9, 10, 11, 12, 13, 14} allocated for UE #1 and UE #2. Accordingly, UE #0 may change the frequency band and repeat the measurement process, thereby measuring a self-interference channel for the entire frequency band including frequency bands which are not allocated for UE #0.

FIG. 9 illustrates a method of repeatedly performing channel measurement through the frequency band allocated to a continuous interval, in relation to one embodiment of the present invention.

UE #0 sets the symbols 910, 920 and 930 to the time interval for measurement of a self-interference channel according to the resource allocation information received from the BS. The BS performs data communication in the symbol 940 allocated for a data transmission region, but does not transmits a signal in the time intervals of the symbols 910, 920 and 930. In addition, UE #0 sets the subcarrier group {0, 1, 2, 3, 4} specified by the resource allocation information to a frequency band for measurement of the self-interference channel.

First, UE #0 transmits a first reference signal and receives a second reference signal of Y(0)[k] (k=0, 1, 2, 3, 4) in the time interval of the symbol 910. Subsequently, UE #0 may change the frequency band to the subcarrier group {5, 6, 7, 8, 9} and repeat transmission and reception of the reference signals in the time interval of the symbol 920, thereby acquiring Y(1)[k] (k=5, 6, 7, 8, 9). In the time interval of the symbol 930, UE #0 may additionally change the frequency band and acquire Y(2)[k] (k=10, 11, 12, 13, 14). The UE may measure a self-interference channel for the entire system frequency band by applying the least square technique to the received signals according to Equation 3 given below.

$$H_{AB}[k] = \frac{Y^{(n)}[k]}{X[k]}$$ Equation 3

In Equation 3, HAB[k] may denote a self-interference channel for subcarrier [k], k denotes each subcarrier (i.e., a frequency band having a certain interval), X[k] may denote the first reference signal transmitted by the UE, n may denote the number of times of repetition, and Y(n)[k] may denote a second reference signal received by the UE. Unlike Equation 1, the repetition process for one subcarrier is not performed in Equation 3, and thus N is omitted.

As described above, the UE may change the orthogonal subcarrier patterns and repeat the channel measurement process, thereby stably measure the self-interference channel for the entire system bandwidth.

As described above with reference to FIGS. 6 to 9, the UE may improve accuracy of a measurement result or acquire additional information by repeating measurement of a self-interference channel through a time interval and a frequency band specified by the BS.

FIG. 10 illustrates a method of configuring a UE group and allocating a frequency resource, in relation to one embodiment of the present invention.

As described above, the BS may allocate different frequency resources for the UEs, thereby allowing the UEs to accurately measure a self-interference channel. However, when the number of the UEs connected to the BS increases, the BS cannot limitlessly divide a frequency band to allocate the frequency band for the UEs. Therefore, the BS may configure a UE group to allocate the frequency band as shown in FIG. 10.

That is, the BS configures UE group #1 including UEs #3, #4 and #5, and UE group #2 including UEs #6, #7 and #8. By configuring UE group #1 and UE group #2, the BS may reuse a frequency band for the UEs which are physically spaced a sufficient distance from each other such that the influence of the UEs on each other is ignorable.

First, the table shown in FIG. 10 shows a relation between the UEs included in the UE groups and the frequency bands. The row 1010 illustrates a case in which the frequency band is allocated to certain intervals, and the row 1020 illustrates a case in which the frequency band is allocated to a continuous interval.

The transmission power of the UE is lower than that of the BS, and thus it undergoes loss according to the distance. Accordingly, even if the BS allocates one frequency band 1012 or 1022 for UEs #3 and #6, the multi-user inference may not occur between the two UEs. Likewise, the BS may allocate one frequency band 1014 or 1024 for UEs #4 and #7, and another frequency band 1016 or 1026 for UEs #5 and #8.

According to one embodiment, the BS may measure a correlation between the UEs using UL signals received from the UEs, and configure UE groups using the measured correlation. That is, using the UL signals, the BS may include UEs having a high correlation in one UE group, or dispose UEs having a low correlation in another UE group. Thereby, the BS may configure a UE group for reuse of the frequency bands allocated for the UEs.

4. Device Configuration

FIG. 11 is a block diagram illustrating configurations of a UE and a BS related to one embodiment of the present invention.

In FIG. 11, each of the UE 100 and the BS 200 may include a radio frequency (RF) unit 110, 210, a processor 130, 230, and a memory 130, 230. While FIG. 11 illustrates a one-to-one communication environment between the UE 100 and the BS 200, a communication environment between plural UEs and the BS 200 may also be established.

Each RF unit 110, 210 may include a transmitter 112, 212 and a receiver 114, 214. The transmitter 112 and the receiver 114 of the UE 100 may be configured to transmit and receive signals with the BS 200 and other UEs, and the processor 120 may be functionally connected with the transmitter 112 and the receiver 114 to control a process in which the transmitter 112 and the receiver 114 transmit and receive signals with other devices. In addition, the processor 120 may perform various kinds of processing for a signal to be transmitted and then transmit the signal to the transmitter 112, and may also perform processing of the signal received by the receiver 114.

When necessary, the processor 120 may store information contained in an exchanged message in a memory 130. With this structure, the UE 100 may implement various embodiments of a method of the present invention as described above.

The transmitter 212 and the receiver 214 of the BS 200 may be configured to transmit and receive signals with other BSs and UEs, and the processor 220 may be functionally connected with the transmitter 212 and the receiver 214 to control a process in which the transmitter 212 and the receiver 214 transmit and receive signals with other devices. In addition, the processor 220 may perform various kinds of processing for a signal to be transmitted and then transmit the signal to the transmitter 212, and may also perform processing of the signal received by the receiver 214. When necessary, the processor 220 may store information contained in an exchanged message in a memory 230. With this structure, the BS 200 may implement various embodiments of a method of the present invention as described above.

The processors 120 and 220 of the UE 100 and the BS 200 instruct (e.g., control, adjust, and manage) the operations of the UE 100 and the BS 200, respectively. The processors 120 and 220 may be connected to the memories 130 and 230 that store program codes and data. The memories 130 and 230 are connected to the processors 120 and 220 and store an operating system, an application, and general files.

The processors 120 and 220 of the present invention may also be referred to as controllers, microcontrollers, microprocessors, microcomputers, or the like. The processors 120 and 220 may be achieved by hardware, firmware, software, or a combination thereof. In a hardware configuration for an embodiment of the present invention, the processors 120 and 220 may application specific integrated circuits (ASICs) or digital signal processors (DSPs), digital signal processing devices (DSPDs), programmable logic devices (PLDs), and field programmable gate arrays (FPGAs) that are configured to implement the present invention.

The method according to embodiments of the present invention as described above may be embodied in a program that is executable in a computer and implemented in a general-purpose digital computer that operates the program using a computer-readable recording medium. Further, the structure of data used for the method described above may be recorded in a computer-readable medium through various means. Program storing devices that may be used to describe a storage device including computer codes executable for implementation of various methods of the present invention should not be construed as including temporary objects such as carrier waves or signals. The computer-readable recording medium includes a storage medium such as a magnetic storage medium (e.g., a ROM, a floppy disk, and a hard disk) and an optically readable medium (e.g., a CD-ROM and a DVD).

It will be apparent to those skilled in the art that various modifications and variations can be made in the present invention without departing from the spirit or scope of the invention. Therefore, the above embodiments should be construed in all aspects as illustrative and not restrictive. The scope of the invention should be determined by the appended claims and their legal equivalents, not by the above description, and all changes coming within the meaning and equivalency range of the appended claims are intended to be embraced therein.

Various embodiments have been described in the best mode for carrying out the invention.

The invention claimed is:

1. A method of supporting measurement of a self-interference channel in a user equipment in a full duplex radio, FDR, communication environment, the method comprising:
   receiving, from a base station, resource allocation information comprising at least one of information about a time interval and information about a frequency band;
   transmitting a first reference signal for measurement of the self-interference channel over a wireless channel in accordance with the resource allocation information; and
   receiving a second reference signal in accordance with the resource allocation information, the second reference signal being input to a receiver of the user equipment according to self-interference,
   wherein the time interval is a time interval in which the base station stops transmission of a signal for measurement of the self-interference channel in the user equipment, and
   wherein the second reference signal is a signal corresponding to the first reference signal transmitted over a wireless channel.

2. The method according to claim 1, further comprising: measuring the self-interference channel by comparing the second reference signal with the first reference signal.

3. The method according to claim 1, wherein the information about the frequency band is used by the user equipment to transmit the first reference signal for measurement of the self-interference channel,
   wherein the information about the frequency band indicates that the frequency band has been allocated to certain intervals or a continuous interval.

4. The method according to claim 3, further comprising: interpolating, when the frequency band is allocated to the certain intervals, results measured through the frequency band; or
   further comprising when the frequency band is allocated to the certain intervals:
   repeatedly performing the transmitting of the first reference signal and the receiving of the second reference signal a predetermined number of times; and
   measuring the self-interference channel from an average value of results of the repeated performance.

5. The method according to claim 3, further comprising when the frequency band is allocated to the continuous interval:
   changing the frequency band and transmitting a third reference signal in a next interval subsequent to the time interval; and
   receiving a fourth reference signal in the next interval, the fourth reference signal being a signal corresponding to the third reference signal input to the receiver of the user equipment according to self-interference.

6. The method according to claim 3, wherein, in the transmitting of the first reference signal, a signal is not transmitted in any frequency band other than the frequency band specified by the resource allocation information.

7. The method according to claim 3, wherein the frequency band that is allocated to certain intervals comprises a subcarrier group indicating subcarriers that are spaced apart from each other by one or more subcarriers, and
   wherein the frequency band that is allocated to a continuous interval comprises a subcarrier group including consecutive subcarriers.

8. A user equipment for supporting measurement of a self-interference channel in a full duplex radio (FDR) communication environment, comprising:
   a transmitter;
   a receiver; and
   a processor connected to the transmitter and the receiver to measure the self-interference channel,
   wherein the processor is configured to:
   control the receiver to receive, from a base station, resource allocation information comprising at least one of information about a time interval and information about a frequency band,
   control the transmitter to transmit a first reference signal for measurement of the self-interference channel over a wireless channel in accordance with the resource allocation information, and control the receiver to receive a second reference signal in accordance with the resource allocation information, the second reference signal being input to a receiver of the user equipment according to self-interference, wherein the time interval is a time interval in which the base station stops transmission of a signal for measurement of the self-interference channel in the user equipment, and wherein the second reference signal is a signal corresponding to the first reference signal transmitted over a wireless channel.

9. The user equipment according to claim 8, wherein the processor is further configured to measure the self-interference channel by comparing the second reference signal with the first reference signal.

10. The user equipment according to claim 8, wherein the about the frequency band is used by the user equipment to transmit the first reference signal for measurement of the self-interference channel, wherein the information about the frequency band indicates that the frequency band has been allocated to certain intervals or a continuous interval.

11. The user equipment according to claim 10, wherein when the frequency band is allocated to the certain intervals, the processor is further configured to interpolate results measured through the frequency band; or wherein when the frequency band is allocated to the certain intervals, the processor is further configured to repeatedly perform transmission of the first reference signal and reception of the second reference signal a predetermined number of times, and to measure the self-interference channel from an average value of results of the repeated performance.

12. The user equipment according to claim 10, wherein, when the frequency band is allocated to the continuous interval, the processor is further configured to:

change the frequency band and to transmit a third reference signal in a next interval subsequent to the time interval, control the receiver to receive a fourth reference signal in the next interval, the fourth reference signal being a signal corresponding to the third reference signal input to the receiver of the user equipment according to self-interference.

13. The user equipment according to claim 10, wherein the frequency band that is allocated to certain intervals comprises a subcarrier group indicating subcarriers that are spaced apart from each other by one or more subcarriers, and wherein the frequency band that is allocated to a continuous interval comprises a subcarrier group including consecutive subcarriers.

* * * * *